Aug. 25, 1931.          C. D. RAMELLI          1,820,158
                VEHICLE BRAKE OPERATING DEVICE
                    Filed June 4, 1930          2 Sheets-Sheet 1
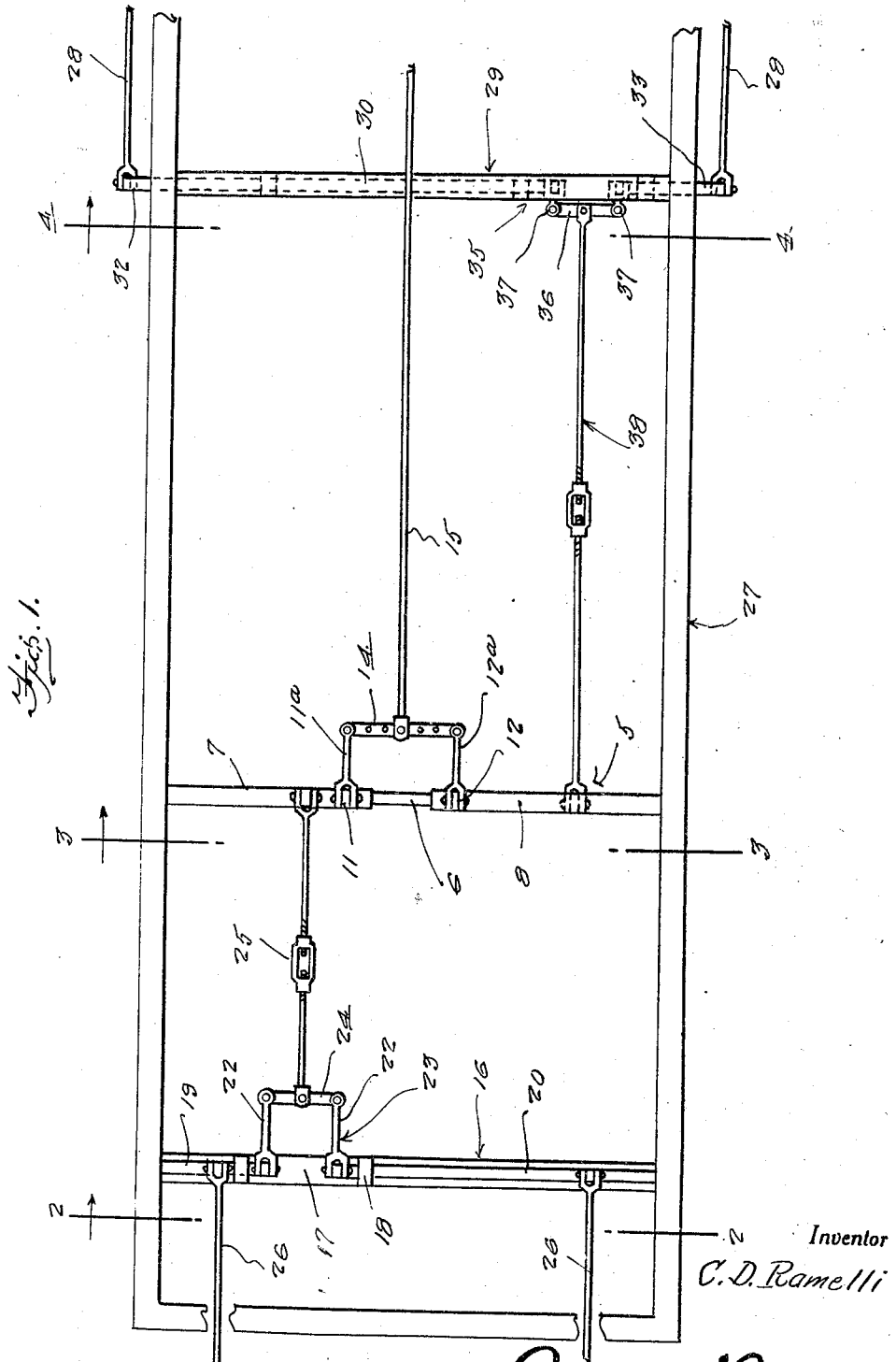
Inventor
C. D. Ramelli
By Clarence A. O'Brien
Attorney Aug. 25, 1931.  C. D. RAMELLI  1,820,158
VEHICLE BRAKE OPERATING DEVICE
Filed June 4, 1930   2 Sheets-Sheet 2
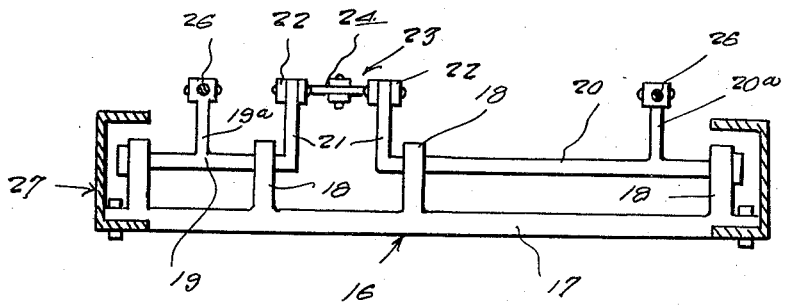
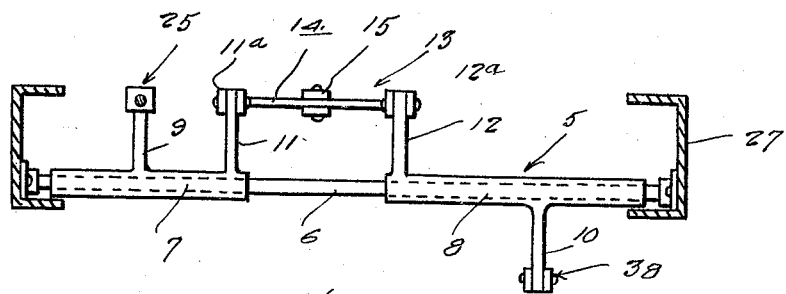
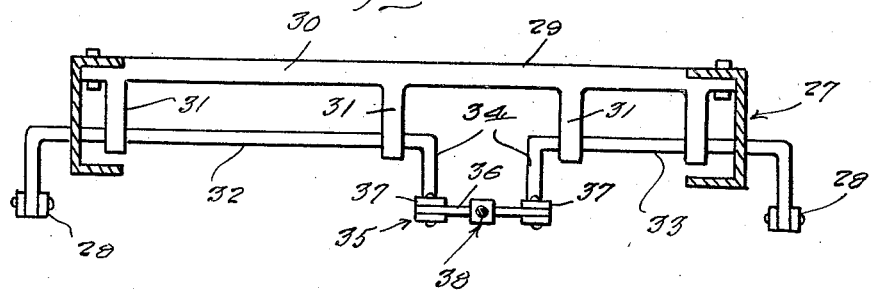
Inventor
C. D. Ramelli.
By Clarence A. O'Brien
Attorney Patented Aug. 25, 1931

1,820,158

UNITED STATES PATENT OFFICE

CHARLES D. RAMELLI, OF RENO, NEVADA

VEHICLE BRAKE OPERATING DEVICE

Application filed June 4, 1930. Serial No. 459,126.

This invention relates to an improved device or apparatus for simultaneously actuating the front and rear brake rods of a four-wheel brake assembly.

By way of introduction, I call attention to a somewhat similar vehicle brake operating mechanism shown and described in my co-pending application, Serial 462,032, filed by me under date of June 18, 1930.

The invention constituting the subject matter of this application relies for its novelty upon a simple, economical, and practical arrangement of mechanical elements associated in effective co-operative relationship to permit the front and rear brake rods to be simultaneously operated from the usual foot brake and the purpose of the invention is to generally improve upon inventions of this general classification by providing an arrangement which is characteristically different from similar patented and marketed structures known to me.

Briefly stated, the improved structure is characterized by a series of transversely disposed longitudinally spaced oscillatory rocker devices or shafts supported on the vehicle chassis and operatively connected in such a manner as to equalize force, stress and strain and to thereby render the operation of the brace substantially uniform throughout the brake system.

In carrying the inventive conception into practice I have found it practical and expedient to utilize three distinguishable rocker shafts, there being a central rocker shaft constituting the master shaft with which the foot brake actuating rod is adjustably connected, and a pair of supplemental or auxiliary rocker shafts for the front and rear brake rods respectively, wherein these latter rocker shafts are adjustably and individually connected with the master shaft in such a manner as to equalize the application of the brake pressure and force throughout the system.

Other features and advantages will become more readily apparent from the following description and drawings.

In the drawings:

Figure 1 is a sort of diagrammatic top plan view showing the general assembly constituting the improved mechanism.

Figures 2, 3 and 4, are cross sections taken on the line 2—2, 3—3 and 4—4 respectively of Figure 1.

Referring now to Figure 1, it will be noted that the reference character 5 designates a substantially centrally disposed transversely extending master shaft. Incidentally the term "shaft" is used to designate the composite or complemental part of the complete assembly which makes up this sectional shaft construction.

For example, it will be noted that the reference character 6 designates a relatively rigid rod or axle of the shaft on which the tubular shaft or sleeve 7 and 8 are rockably mounted.

As shown in Figure 3, the shaft section 7 is provided with an upstanding rocker arm 9 while the shaft section 8 is provided with a central depending rocker arm 10. The spaced end portions of these shaft sections 7 and 8 are provided with additional rocker arms 11 and 12 with which an adjustable coupling device 13 is connected. This device comprises a pair of links 11a and 12a respectively connected with the corresponding rocker arms.

These links are pivotally connected with the rocker arms 11 and 12 at one end and at the opposite ends have pivotal connection with an apertured tie link 14. The clevis on the rear end of the foot brake actuating rod 15 is adjustably connected with the device 13 through the medium of the tie link 14. This permits the sections 7 and 8 to be simultaneously manipulated from the foot brake (not shown) by way of the rod 15.

In Figure 2, the numeral 16 designates generally the rear supplemental rocker shaft assembly which comprises a rigid supporting bar 17 having upstanding bearings 18 to accommodate the relatively short and long rocker shafts 19 and 20 respectively. The companion rocker arm 21 on the adjacent ends of these sections 19 and 20 are connected with the links 22 of the rear coupler 23.

Here again, I provide a tie link 24 for connecting the two links together. The numeral 25 designates a turnbuckle which is connected at one end with the central portion of the link 24 and connected at its opposite end with the aforesaid rocker arm 9. The arms 19a and 20a of the shaft sections 19 and 20 respectively serve to accommodate the rearwardly extending brake operating rod 26 as shown for example in Figure 1. This arrangement disposes the operating connection 25 to the left of the longitudinal axis of the chassis frame 27 and thereby offcenter with respect to the longitudinal disposition of the foot brake rod 15. This provides the desired transmission of power from the rod 15 to the rear brake rod 26, and affords the necessary relative compensating action between the respective parts by way of the adjustable connection.

It will be noticed that the rod 25 lies in a plane substantially even with the rod 15. The one brake rod, however, designated by the numerals 28 are disposed on a plane below the rods 15 and 25 as well as below the chassis frame 27.

The front rocker shaft assembly is reversed with respect to that shown in Figure 2 to accommodate this particular arrangement of the rods 28. This front assembly is generally designated by the numeral 29 and comprises a supporting bar 30 rigidly fastened to the top flanges of the chassis frame and provided with depending bearings 31 so arranged as to accommodate the left and right rocker shaft sections 32 and 33 respectively.

In this arrangement the rocker arms 34 connect with a coupler, generally designated by the numeral 35 and comprising a tie link 36 and complemental connecting links 37 which are connected with the rocker arm 34. The numeral 38 designates an elongated turnbuckle or connecting rod structure which has its forward end connected with the tie link 36 and its rear end connecting with the depending crank arm 10 as shown better in Figure 3.

In interpreting the claims for this novel rocker assembly, the parts 5, 16 and 29 are to be construed as rocker shaft assemblies inasmuch as these are of a composite and unitary nature. The central rocker shaft assembly, indicated by the numeral 5 is the master rocker shaft, the rear one 16 is the rear supplemental rocker shaft assembly, and the one at 29 is the front rocker shaft assembly.

The equalization of action is permitted by the central disposition of the main actuating foot brake rod 15 with the master shaft 5, together with the arrangement of auxiliary shaft assemblies which are in turn connected with the master shaft through the medium of the operating connections 35 and 38 respectively, which connections are disposed on opposite sides of the longitudinal axis of movement of the shaft 15.

The brake control rods 26 leading to the rear are confined within the area of the chassis frame, whereas the front brake control rods 28 are disposed on the outside of the chassis frame. The fact that each rocker shaft assembly comprises a relatively rigid part and the sectional oscillatory part, together with the individual link and rod connections provides the desired mechanism for equal distribution of strain and permits the structure to compensate for existing irregularities, whereby to permit the desired uniform simultaneous operation of the rods 26 and 28 respectively.

In other words, the rotation of the rocker shaft sections 7 and 8 in a forward direction permits simultaneous pulling of the connecting rods 25 and 38 in opposite directions to apply the braking force properly to the brake drum, both at the front and rear of the vehicle.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

A four wheel brake mechanism for vehicles including in combination a shaft extending transversely of the frame of a vehicle, a pair of sleeves mounted upon said shaft, supports extending transversely of the vehicle frame forwardly and rearwardly of said shaft, each of said supports including a bar having a plurality of bearings, the bar of one of said supports being upset with respect to the bar of the other of the supports, a pair of shafts journalled in the bearings of each support bar, one of said sleeves embodying a pair of similarly directed arms, the other of said sleeves embodying a pair of oppositely directed arms, a brake control rod, means operatively connecting said rod with the inner arms of said sleeves, each of said rock shafts provided with a pair of crank arms, longitudinally adjustable means connecting the inner arms of one pair of shafts with the outer arm of one of said sleeves, a second longitudinally adjustable means connecting the inner arms of the second pair of shafts with the outer arm of the other of said sleeves, and means operatively connecting the outer arm of each shaft of the respective pairs of shafts with the wheel brakes at corresponding ends of the vehicle frame.

In testimony whereof I affix my signature.

CHARLES D. RAMELLI.